B. M. ROBERDS.
AUTOMATIC VALVE CONTROLLING MECHANISM.
APPLICATION FILED APR. 19, 1918.

1,322,951.

Patented Nov. 25, 1919.
2 SHEETS—SHEET 1.

Witnesses
Philip Ferrell
Francis L. Boswell

Inventor
B. M. Roberds

By
D. Swift & Co.
Attorney

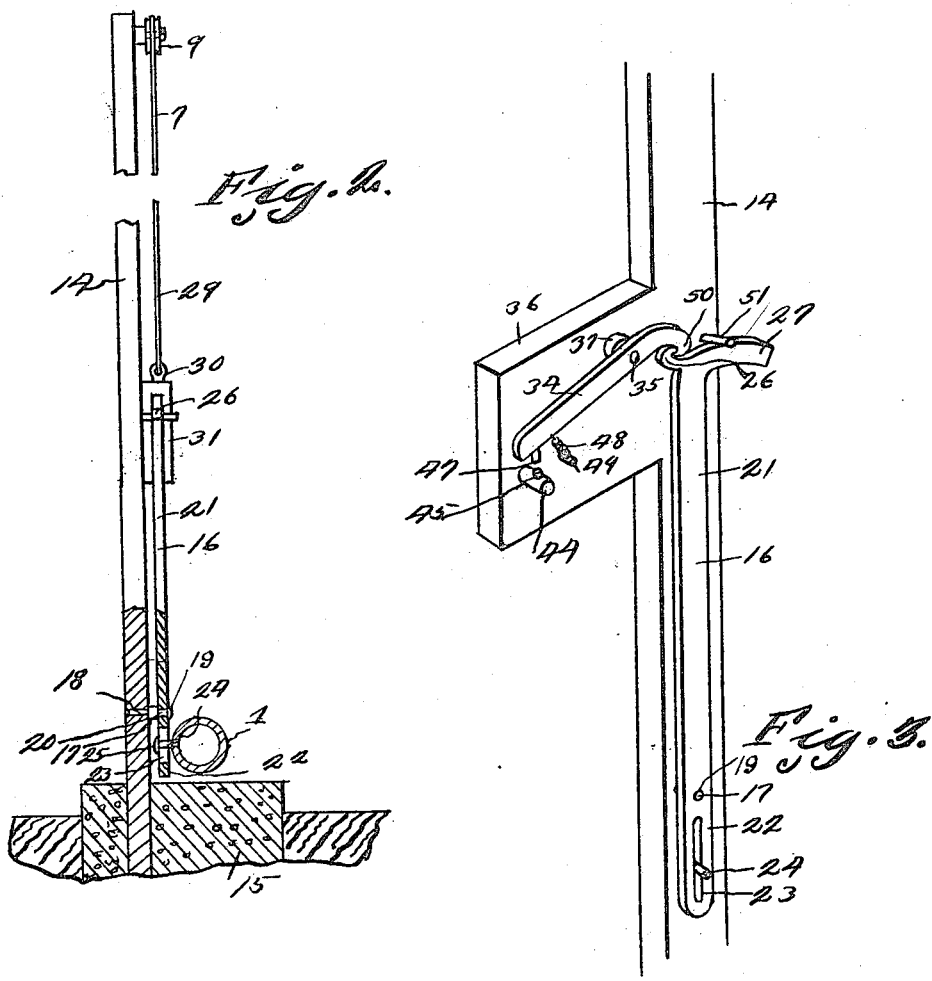

UNITED STATES PATENT OFFICE.

BENJAMIN MILTON ROBERDS, OF CHANUTE, KANSAS.

AUTOMATIC VALVE-CONTROLLING MECHANISM.

1,322,951.   Specification of Letters Patent.   Patented Nov. 25, 1919.

Application filed April 19, 1918. Serial No. 229,576.

*To all whom it may concern:*

Be it known that I, BENJAMIN MILTON ROBERDS, a citizen of the United States, residing at Chanute, in the county of Neosho, State of Kansas, have invented a new and useful Automatic Valve-Controlling Mechanism; and I do hereby declare the following to be a full, clear, and exact description of the invention, such as will enable others skilled in the art to which it appertains to make and use the same.

This invention relates to an improved automatic valve controlling mechanism, for use in connection with various types of power plants, and an object of the invention is to provide an automatic device of this kind, for automatically closing the water supply tank valves, and opening all the other valves of the entire plant, for draining the plant or system, thereby preventing freezing and bursting of the engines and pumps.

A further object of the invention is to provide an automatic controlling mechanism of this kind, which when an exhaust pipe contracts, incident to stopping the engine, automatically actuates, to permit the water supply tank valves and the other valves of the entire system or plant to respectively close and open, thereby allowing the water supply to cease, and the entire system to drain said valves to actuate under the action of weights.

A further object of the invention is to provide a detent device to be actuated by the contraction of the exhaust pipe, in combination with an alarm actuated by the detent, to sound the alarm.

In practical fields the details of construction may necessitate alterations falling within the scope of what is claimed.

The invention comprises further features and combination of parts as hereinafter set forth shown in the drawings and claimed.

In the drawings:—

Fig. 2 is a vertical sectional view on line 2—2 of Fig. 1.

Fig. 3 is a perspective view of the detent device and its support.

Figure 1:
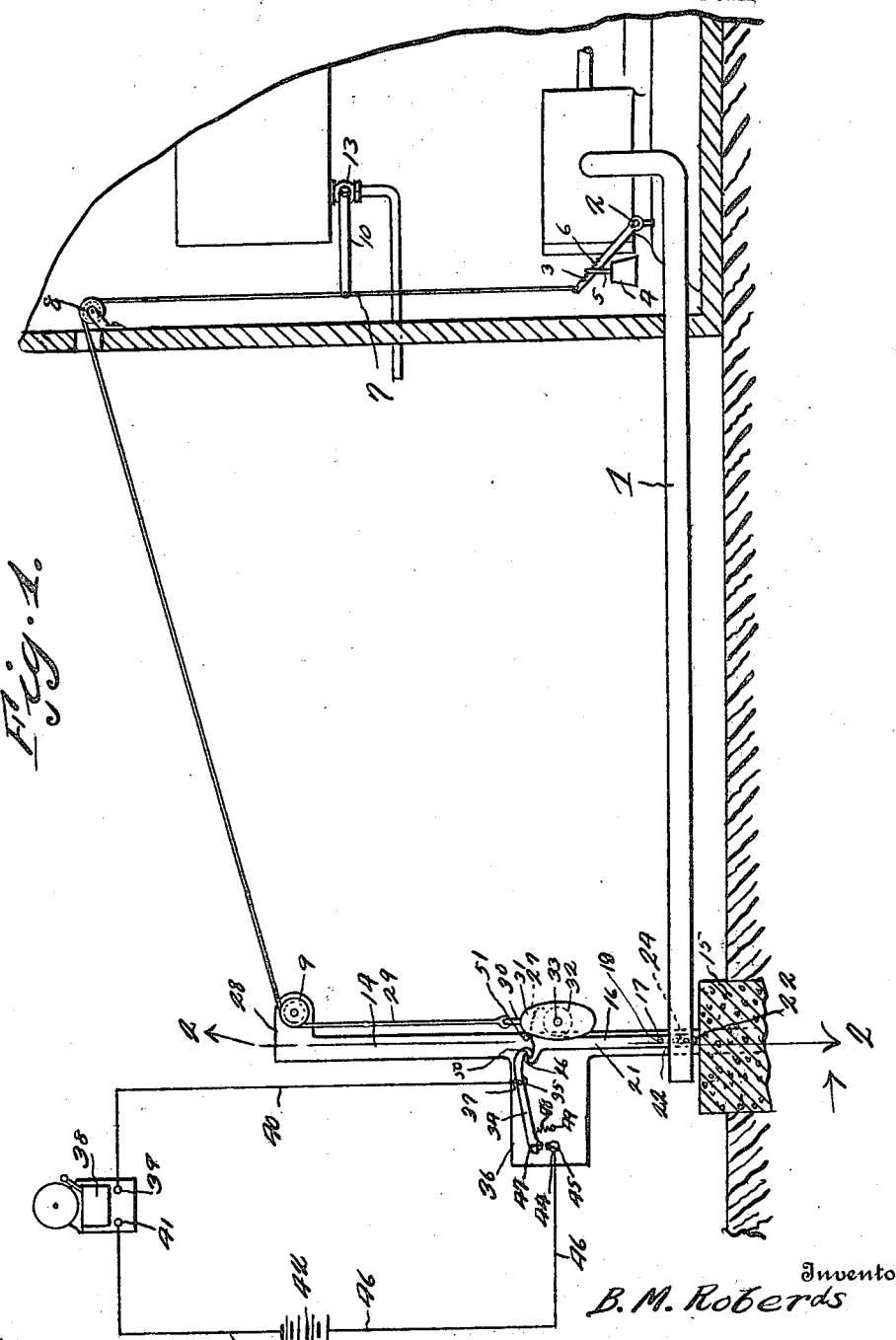
Figure 1 is a view in side elevation of the improved automatic valve controlling mechanism as applied for controlling the valves.

Referring more especially to the drawings, 1 designates an exhaust pipe of an engine or the like, and 2 denotes the valve stem of a valve, which may be opened for draining the water jacket of the engine. A lever 3 is carried by the valve stem, and 4 is a weight, the eye 5 of which may engage any one of the notches 6 on the lever 3, so that when the supporting cable or rope 7 (which passes over the pulleys 8 and 9) slackens or is released, the lever 3 gravitates under the action of the weight 4, opens the valve 2, so as to drain the water jacket of the engine. The rope or cable 7 may have other connections (not shown) to other drain valves and the like (not shown), so as to drain the entire system of a plant. However, the rope or cable is also attached to a lever 10, of a water supply tank valve 13, whereby such valve may be closed to cut off the supply of water to the tank. An upright or standard 14 is mounted in a concrete base 15, and the automatically operated detent is carried by the upright. This detent comprises a lever 16, which is pivoted on the contracted end 17 of the pin 18, which is mounted in the upright. The lever is located between the head 19 and the shoulder 20 of said pin. The lever 16 has a long arm 21 and a short arm 22. The short arm has an elongated slot 23, and a headed pin 24, which is carried by the end portion of the exhaust pipe 1, engages in the slot 23 the head 25 of said pin preventing the displacement of the pin from the slot. The upper end of the long arm 21 is provided with a hook 26 on one side and a lateral curved arm 27 on the other side. The pulley 9 is carried by a lateral portion 28 of the upper end of the upright 14. The end 29 of the rope or cable is connected to an eye 30 of the U-shaped member 31 between the sides of which a roller 32 is mounted upon a pin 33. When the valve 2 is closed and the exhaust pipe 1 is expanded owing to it being constantly heated from the exhaust of the engine, the arm 27 is in engagement with the roller 32, so as to hold the cable or rope tight to support the weighted lever 3, a lever 34 is pivoted at 35 to a lateral part 36 of the upright 14. The pivot 35 carries suitable insulating material as shown at 37 to insulate the lever 34 from the part 36. A suitable alarm bell 38 is provided, and one of its binding posts 39 is electrically connected to the lever 34 by the wire or lead 40, the other binding post 41 is connected to the battery 42 by the wire 43. The lateral portion 36 of the upright 14 is provided with a lateral lug 44, having a contact 45, and one end of a lead or wire 46 is connected to the lug 44 and has its other end connected to the battery 42. The lever 34 has a contact 47. A spring 48 has one end connected to the lateral part 36 of the upright 14 as at 49, and its other end to the long arm of the lever 34. The short arm of the lever 34 terminates in a hook 50, which is engaged by the hook 26 of the long arm 21 of the lever 16, that is when the valve 2 is closed. When the exhaust pipe 1 contracts incident to cooling off after the engine is stopped, the contraction of the pipe causes the lever 16 to receive an oscillating movement, sufficiently to disengage the arm 27 from the roller 32, and to disengage the hooks 26 and 50. When the arm 27 disengages the roller 32 the lever 3 under the action of the weight 4 will gravitate and open the valve 2, thereby draining the water jacket of the engine. The valve may be a valve on a pump or on any other device of a plant that needs draining, when the plant is to be closed down, for preventing freezing. When the hooks 26 and 50 are disengaged, the lever 34 will be rocked by the action of the spring 48, causing the contact 47 to engage the contact 45, thereby closing the circuits on the wires or leads, 40, 43 and 46, and sounding the alarm bell 38. A lateral projection 51 is carried by the upright 14 to be engaged by the U-shaped member 31 for preventing the member 31 from following the arm 27 when the lever 16 is oscillated.

The invention having been set forth what is claimed as new and useful is:—

In combination, a circuit closer comprising a lever, a support therefor to which said lever is pivoted, one end of said lever having a hook, a detent lever provided with long and short arms, the long arm having a hook to engage the hook of the lever of the circuit closer to normally hold the circuit closer open, and means adapted to contract incident to cooling off and having a loose connection with said short arm to oscillate the detent lever whereby the hooks may be disengaged to release the circuit closer, the long arm of the detent lever having a lateral arm, a gravitating device, and means connected to the gravitating device and in turn to the lateral arm, whereby as the detent lever is oscillated and disengaged from said means the gravitating device is released.

In testimony whereof I have signed my name to this specification in the presence of two subscribing witnesses.

BENJAMIN MILTON ROBERDS.

Witnesses:
GEO. E. SIBERT,
M. R. HOSACK.